US012693689B2

(12) United States Patent
Gebel et al.

(10) Patent No.: US 12,693,689 B2
(45) Date of Patent: Jul. 28, 2026

(54) METHOD FOR PRODUCING A NONLINEAR CYLINDRICAL SPRING AND USE OF SUCH A SPRING

(71) Applicant: Rolls-Royce Deutschland Ltd & Co KG, Blankenfelde-Mahlow (DE)

(72) Inventors: Gregor Christoffer Gebel, Ludwigsfelde (DE); Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 68 days.

(21) Appl. No.: 18/614,037

(22) Filed: Mar. 22, 2024

(65) Prior Publication Data

US 2024/0345605 A1 Oct. 17, 2024

(30) Foreign Application Priority Data

Apr. 11, 2023 (DE) ..................... 10 2023 203 284.8

(51) Int. Cl.
G05D 7/01 (2006.01)
B21F 3/02 (2006.01)

(52) U.S. Cl.
CPC ............. G05D 7/0126 (2013.01); B21F 3/02 (2013.01)

(58) Field of Classification Search
CPC .......... G05D 7/0126; G05D 7/01; G05D 7/00; B21F 3/02; B21F 3/00; B21F 35/00
See application file for complete search history.

(56) References Cited

U.S. PATENT DOCUMENTS 2,145,081 A * 1/1939 Gogan ................... B21F 35/00
                                                    72/170
4,810,231 A * 3/1989 Weissenberger ........ F16F 1/043
                                                    464/68.4
5,548,898 A    8/1996 Noll, Jr.
              (Continued)

FOREIGN PATENT DOCUMENTS

CA        2750672 A1    3/2012
DE        1602680 A     4/1970
              (Continued)

OTHER PUBLICATIONS

German Search Report dated Jan. 30, 2024 from Counterpart German Patent Application No. 10 2023 203 284.8.

*Primary Examiner* — Lawrence Averick
(74) *Attorney, Agent, or Firm* — SHUTTLEWORTH & INGERSOLL, PLC; Timothy J. Klima

(57) ABSTRACT

A method for producing a nonlinear cylindrical spring produced by winding or coiling a spring wire having wire diameters varying over its length, and formed from a blank with a constant diameter. A drum roller shapes the blank and, between the outer lateral surface of an inner rotor driven in rotation about a central longitudinal axis and the inner lateral surface of a drum concentric with the rotor, has an annular gap which tapers continuously from an input side to an output side, the clear opening width of which, viewed in the radial direction, is greater than the diameter of the blank on the input side and equal to or smaller than the minimum wire diameter of the spring wire on the output side, and the blank is shaped by moving it into the annular gap from the input side to the output side.

9 Claims, 3 Drawing Sheets

(56)                    References Cited

U.S. PATENT DOCUMENTS

Figure 1:
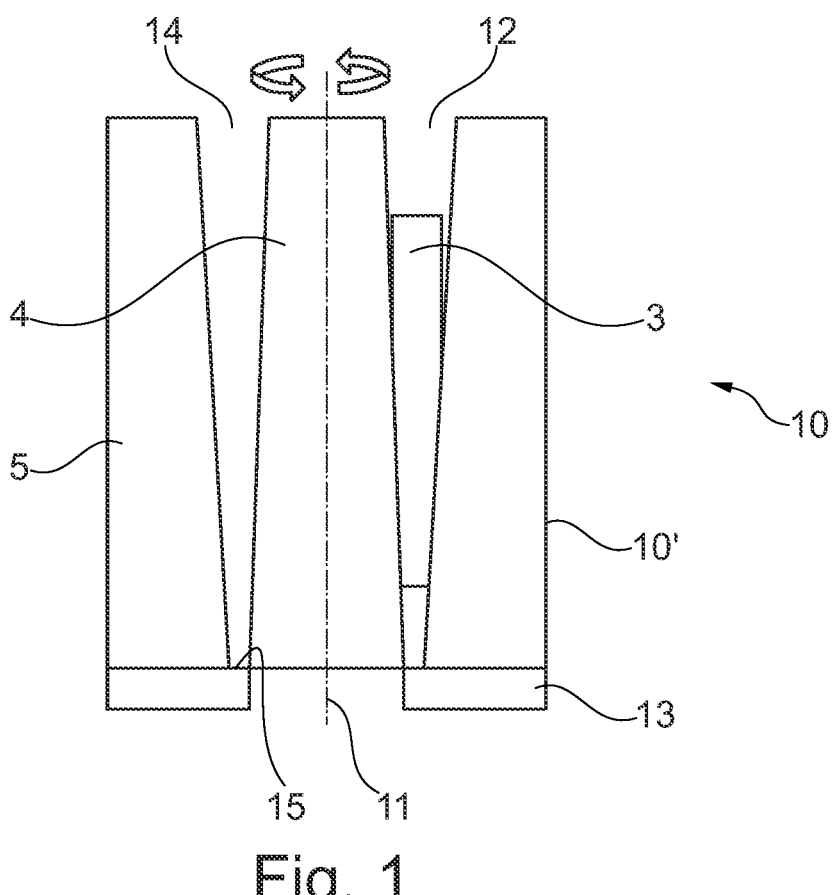

| 9,694,969 | B2 * | 7/2017 | Abegglen | ............... | A47J 31/22 |
|---|---|---|---|---|---|
| 2010/0101732 | A1 * | 4/2010 | Howley | ............... | B29D 30/242 |
| | | | | | 156/414 |
| 2013/0309371 | A1 * | 11/2013 | Abegglen | .......... | B65D 85/8052 |
| | | | | | 426/112 |

FOREIGN PATENT DOCUMENTS

| DE | 1752609 | A1 | 6/1971 |
|---|---|---|---|
| DE | 2506420 | A1 | 8/1976 |
| DE | 4321337 | A1 | 1/1995 |
| DE | 19800237 | A1 | 4/1999 |
| DE | 4345483 | A1 | 6/1999 |
| DE | 102009060231 | A1 | 6/2011 |
| DE | 102014102061 | A1 | 8/2015 |
| GB | 301075 | A | 10/1929 |
| JP | H03189036 | A | 8/1991 |
| WO | 9929548 | A1 | 6/1999 |
| WO | 2020151998 | A1 | 7/2020 |

* cited by examiner a)

b)

a)

METHOD FOR PRODUCING A NONLINEAR CYLINDRICAL SPRING AND USE OF SUCH A SPRING

This application claims priority to German Patent Application 102023203284.8 filed Apr. 11, 2023, the entirety of which is incorporated by reference herein.

The invention relates to a method for producing a non-linear cylindrical spring which is produced by winding or coiling a spring wire having wire diameters varying over its length, and which is formed from a blank with a constant diameter over its longitudinal extension. The invention further relates to the use of such a method and to a valve having a nonlinear spring.

A method of this type for producing a nonlinear cylindrical spring is specified in WO 99/29548 A1. The spring has a constant cylindrical outer diameter or constant cylindrical inner diameter, wherein the wire diameter of the spring wire varies over the length of the spring. In this case, the nonlinear spring can be produced by winding a spring wire with a cross section that varies over its length from the outset or by removing material from the outside of the spring. The nonlinear spring is used to support the pedal of a braking system with a progressive spring rate.

A further nonlinear spring with a constant inner diameter and a spring wire with a cross-sectional area that differs over its length is shown in DE 10 2014 102 061 B4. Over its length, the spring also has portions having a constant cross-sectional area of the spring wire. This spring is also used to support a brake pedal of a controlled brake system for a motor vehicle.

Nonlinear cylindrical springs are also shown in CA 2 750 672 A1 and furthermore in U.S. Pat. No. 5,548,898, GB 301 075, WO 2020/151998 A1 and U.S. Pat. No. 4,810,231.

Furthermore, it is known to design springs conically with a nonlinear spring characteristic curve or to wind them conically, or to achieve the nonlinearity of the spring travel by the combination of a plurality of linear springs in series and/or parallel. It is often difficult to spatially integrate nonlinear springs designed in this way into a single unit, such as compactly in a cylindrical cavity.

Another difficulty is to achieve exactly one travel path, for example, for positioning a piston or setting a flow cross section or closing a line, with nonlinear springs.

The object of the present invention is to provide a method for producing a nonlinear cylindrical spring with which the travel path of an actuator loaded with a spring force can be mapped as accurately as possible, and to indicate an advantageous use of a spring produced according to the method.

This object is achieved by a method, a use and a valve as disclosed herein.

In the method, it is provided according to the invention that a shaping device designed as a drum roller is provided to shape the blank and, between the outer lateral surface of an inner rotor driven in rotation about a central longitudinal axis and the inner lateral surface of a drum concentric with the rotor, has an annular gap which tapers continuously from an input side to an output side, in particular conically, the clear opening width of which, viewed in the radial direction, is greater than the diameter of the blank on the input side and equal to or smaller than the minimum wire diameter of the spring wire on the output side, and the blank is shaped by moving it into the annular gap from the input side to the output side.

In this case, an advantageous embodiment consists in that the shaping device is operated in a vertical alignment of its central longitudinal axis with an upper input side and bottom output side, wherein the blank is moved into the annular gap assisted by gravity.

With this embodiment of the method, a spring wire with a continuous taper can be shaped precisely to reproduce a travel path of an actuator to be positioned, wherein the drum roller with the lateral surface of the drum and the lateral surface of the rotor can be adapted precisely to the diameter profile reproducing the travel path.

In the alternative embodiment according to the invention it is provided that a shaping device designed as a roller press is provided for shaping the blank, which roller press has a rigid lower support jaw and a pressing jaw arranged above it, forming a pressing gap, which can be moved back and forth in a direction y relative to the support jaw, wherein the pressing gap has, in a vertical plane x-z perpendicular to the direction y, a contour to be impressed on the blank while shaping the spring wire, and the blank is inserted into the pressing gap in the x-direction at right angles to the y-direction for shaping, and the pressing jaw is then moved back and forth relative to the support jaw while applying a pressing pressure in the z-direction to shape the spring wire with the wire diameter varying over its length.

With this embodiment as well, the course of the wire diameters varying over the length of the spring wire can also be specified exactly according to the requirements of the travel path of an actuator, in particular within a valve, so that, for example, a fuel mass flow or fuel pressure can be set exactly according to requirements. With this embodiment of the method, the spring wire can advantageously also be produced with alternating portions of constant and tapering wire diameters.

To shape the spring wire with exact mapping of the travel path, it is advantageously provided that the geodesic top surface of the support jaw is formed flat and aligned horizontally to form the contour of the pressing gap, and the underside of the pressing jaw is formed in the x-z plane corresponding to the longitudinal contour of the spring wire to be shaped, and the pressing jaw is lowered in the direction of gravity while exerting the pressing pressure until the specified value of the wire diameter is reached.

Different diameter courses over the length of the spring wire can be advantageously produced in that the contour of the pressing gap is formed in continuously tapering manner corresponding to a continuous tapering of the spring wire to be produced, or the contour of the pressing gap is formed in a continuously tapering manner in portions and with a constant (vertical) gap height in between to produce a spring wire with alternating continuously tapering and cylindrical portions.

The production of the spring from the shaped spring wire is advantageously carried out by winding the spring wire by means of a winding machine with a clamping device that opens according to the wire diameter or by means of a winding bench, wherein the wire is firmly clamped at one end on a rotor and bent by a tool that does not rotate therewith and wound around a rotating winding rotor.

Various advantageous embodiments for spatial integration during installation, such as in a receiving chamber with a cylindrical inner wall, a piston with a cylindrical lateral surface or an assembly with other springs, are obtained by winding or coiling the nonlinear spring cylindrically with respect to its inner diameter, or its central diameter, or its outer diameter.

For precise control of a valve, it is advantageous that the wire diameter of the spring wire is shaped over its length in accordance with a spring load over the travel path to set the position of an actuator, in particular a piston, in a valve.

Advantages of the invention also result from the use of a spring produced according to a method according to any of the preceding claims in a valve for setting the travel path of an actuator, in particular a piston.

An advantageous use is in particular also that a fuel mass flow or fuel pressure is controlled by means of the valve.

The idea of the invention is also advantageously applied to a valve with a nonlinear cylindrical spring that consists of a spring wire with a wire diameter varying over its length, in particular produced by a method disclosed herein.

Figure 2:
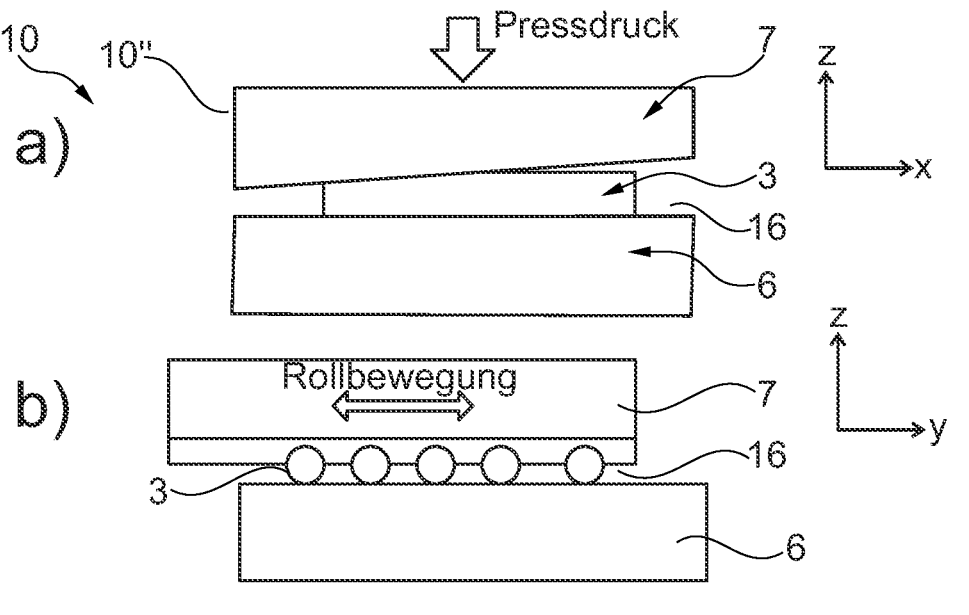
Figure 3:
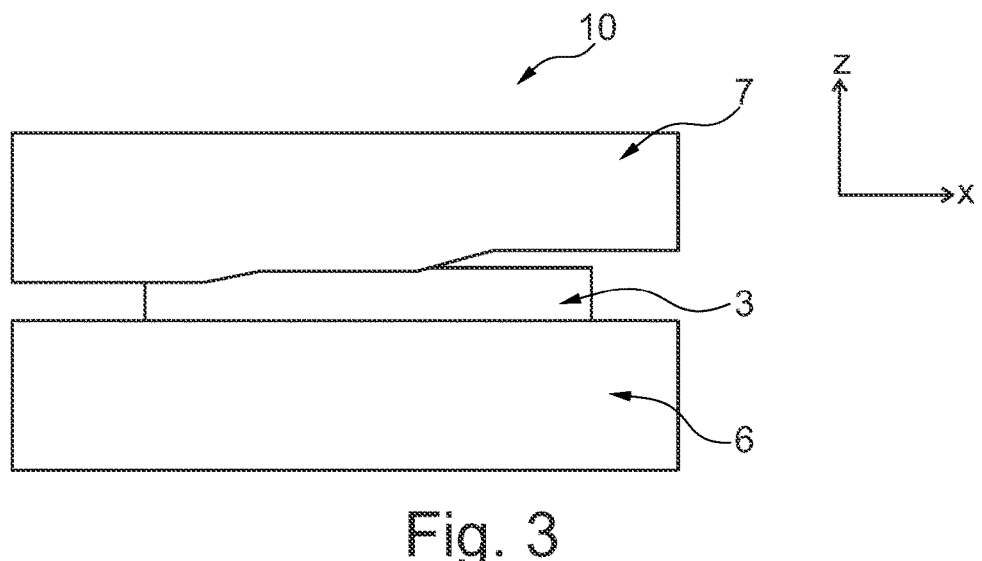
Figure 4:
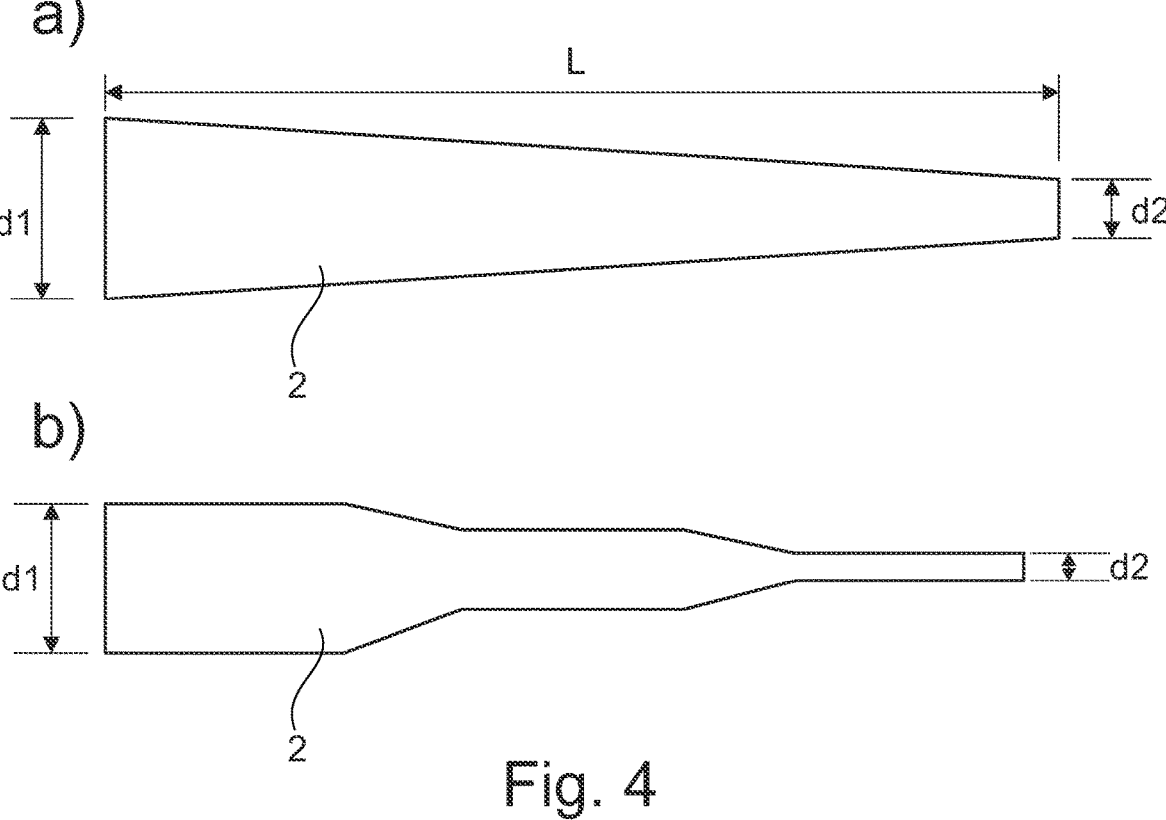
Figure 5:
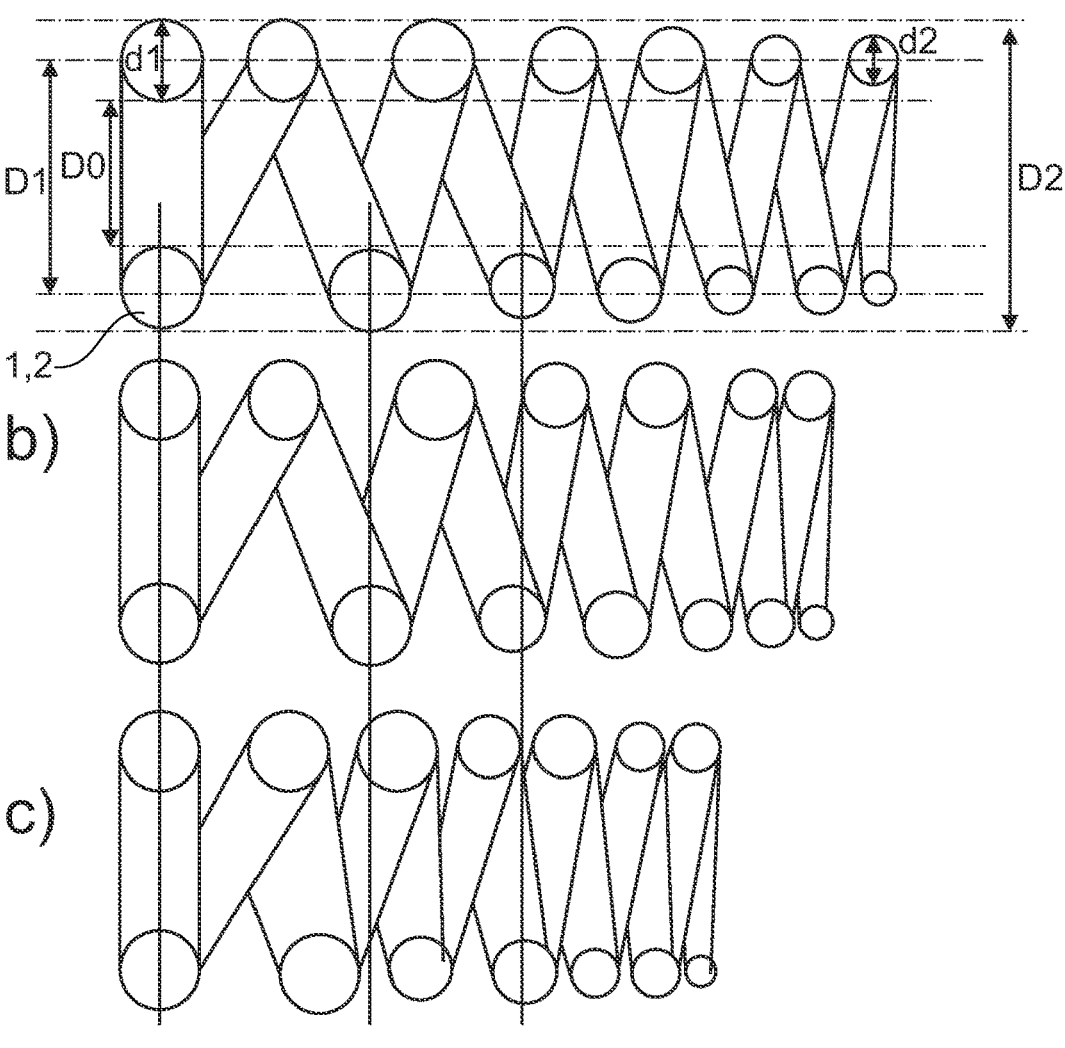
Figure 6:
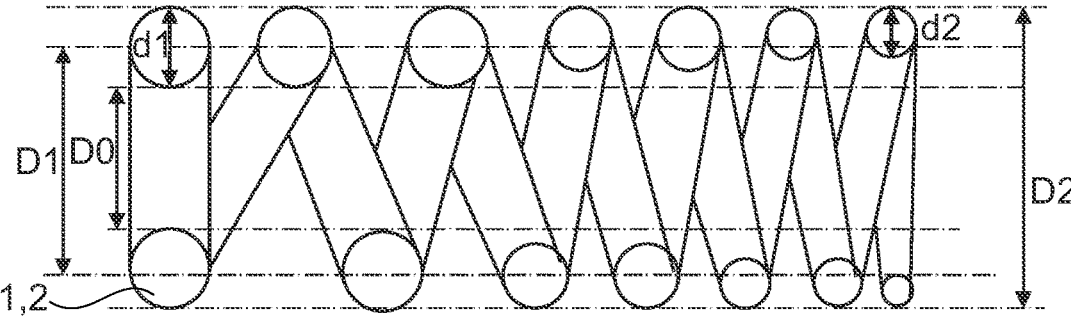

The invention is explained in more detail below on the basis of exemplary embodiments with reference to the drawings. In the drawings:

FIG. 1 shows a shaping device for a spring wire in an embodiment as a drum roller in a schematic longitudinal sectional view, FIG. 2 shows an alternative embodiment of a shaping device for shaping a spring wire in an embodiment of a roller press in a schematic longitudinal view (partial image a)) and in a schematic front view (partial image b)), FIG. 3 shows a further exemplary embodiment of the shaping device in an embodiment as a roller press for an alternative shaping of the spring wire in a schematic longitudinal sectional view, FIG. 4 shows, in partial images a) and b), two exemplary embodiments of an unwound spring wire with a continuously decreasing diameter over its length (partial image a)), or with constant diameter in portions and alternating with a continuously decreasing diameter in portions in a shortened schematic side view, FIG. 5 shows a spring with a decreasing cross section or diameter of the spring wire in a schematic longitudinal view in three load states shown in partial images a), b) and c) from the top to the bottom, wherein the diameter of the spring is kept constant in the wire center, and FIG. 6 is a further schematic longitudinal view of a spring with a decreasing cross section or diameter of the spring wire, wherein the diameter of the spring is kept constant on its outside.

FIG. 1 shows a method for shaping a spring wire 2 for an axial cylindrical spring 1 (see FIGS. 5 and 6) by means of a shaping device 10 which is designed as a drum roller 10'.

As a drum roller 10', the shaping device 10 has a rotor 4 that is rotationally drivable or rotationally driven during the production of the spring wire 2, with a central longitudinal axis 11 forming the axis of rotation, and a drum 5 arranged concentrically to the rotor 4, wherein the inner lateral surface of the drum 4 is spaced apart from the outer lateral surface of the rotor 5 in order to form a completely circumferential annular gap 12 which continuously tapers from an input side 14 to an output side 15. A blank 3 to be shaped into the spring wire 2 is introduced into the annular gap 12.

The annular gap 12 has, on its input side 14, a radial clearance width which is greater than the diameter of the blank 3 which is round in cross section and is at most as large as the smallest diameter of the spring wire 2 to be shaped from the blank 3. The drum roller 10' is closed on its underside by a support 13 which extends at least over the region of the annular gap 12.

The blank 3 of correspondingly thick cylindrical wire, which is inserted into the annular gap 12, rolls in a circle on the inner lateral surface of the drum 4 and the outer lateral surface of the rotationally driven rotor 5. In this case, the blank 3 gradually moves further downwards in the annular gap 12 of the drum roller 10' positioned vertically with respect to the central longitudinal axis 11, until it comes into contact with its lower end face on the support 13.

In the design of the shaping device 10 as a drum roller 10' shown in FIG. 1, the annular gap 12 tapers linearly or conically downward, wherein the diameter of the annular gap 12 remains constant from top to bottom over its center circle (imaginary cylinder), and the angle of inclination of the inner lateral surface of the drum 5 and the outer lateral surface of the rotor 4 to the vertical are equal in size. A nonlinear, but continuous tapering of the annular gap 12 symmetrical with respect to a concentric (imaginary) cylindrical central surface would also be conceivable. Spring wires 2 can be formed with a diameter that tapers continuously over the length L by means of the drum roller 10' designed in this way.

FIG. 2 shows an alternative embodiment of the shaping device 10 in the form of a roller press 10" in a schematic longitudinal view (partial image a)) and in a schematic front view (partial image b)). The roller press 10" has an arrangement of shaping jaws which comprises a lower support jaw 6 in its (geodesically) lower region and a pressing jaw 7 arranged at a distance above in its upper region to form a pressing jaw 16. The pressing gap 16 has an adapted longitudinal contour for shaping the spring wire 2 with a diameter that varies over its length from the blank 3, in this case for shaping a spring wire 2 with a diameter that tapers continuously over its length, as can be seen in partial image a). In the shown embodiment of the roller press 10", the surface of the support jaw 6 is aligned horizontally in an x-y plane and is designed as a flat surface. According to the continuously tapering shape of the spring wire 2 to be produced, the underside of the pressing jaw 7 is formed continuously inclined relative to the horizontal in the x-direction in which the blank 3 is inserted into the pressing gap 16 in the longitudinal direction. In order to shape the blank 3 into to the spring wire 2 with the desired diameter that tapers over the length, the upper pressing jaw 7 is moved downwards under sufficient pressure in the z-direction perpendicular to the x-y plane, while the upper pressing jaw 7 moves back and forth relative to the lower support jaw 6 in the horizontal y-direction perpendicular to the longitudinal extension of the blank 3. Due to the rolling movement of the blank(s) 3 introduced into the pressing gap 16 under the simultaneously exerted pressure, the blank(s) 3 is/are gradually shaped into the spring wire 2 with the desired diameter profile.

By means of the roller press 10", spring wires 2 with other diameter courses over the length can advantageously also be produced, such as spring wires 2 whose diameter course alternatingly has portions with a tapering diameter and portions having a constant diameter. A roller press with such a pressing gap 16 is shown in FIG. 3 in a lateral longitudinal view.

FIG. 4 shows (schematically) a spring wire 2 with a diameter profile or cross section which tapers continuously over its length from a maximum diameter d1 up to a minimum diameter d2.

The partial image b) schematically shows a spring wire 2 with alternating portions of the same diameter and a continuously decreasing diameter with a maximum diameter d1 and a minimum diameter d2.

FIG. 5 shows a spring 1 made of spring wire 2 with a diameter d1 to d2 that tapers over its length (with a small projection). The cylindrical spring 1 has a constant mean diameter D1 over the length of the spring (with respect to the center of the spring wire), wherein the outer diameter D2 of the spring 1 accordingly decreases over its length, and the inner diameter DO accordingly increases. The three partial images a), b) and c) show the spring deflection in three different load states, namely in partial image a) without pressure in the axial direction, as in the rest state, in partial image b) at a low axial pressure, and in partial image c) at a higher axial pressure force. As can be seen in the three partial images, with increasing spring load, the windings with the smaller spring wire diameter initially approach one another (partial image b)) and, with increasing spring load, also the windings with a larger spring wire diameter (partial image c)). Accordingly, the path/force characteristic curve of the spring 1 is not linear.

FIG. 6 shows an example of a nonlinear cylindrical spring with an outer diameter d2 which is constant over its length, wherein the spring wire diameter 2 likewise continuously decreases from a maximum diameter d1 to a minimum diameter d2 (also with a small projection).

Accordingly, the nonlinearity of the spring travel is characterized in that the thinner (less flexurally rigid) portion of the spring 1 is first pressed and then the thicker (flexurally rigid) portions. The material of the spring wire 2 is, for example, steel, aluminum, copper, or titanium.

The spring wire 2 produced according to the presented method relative is further processed to form the spring 1 by winding or coiling, wherein the machines are correspondingly adapted in order to take into account the thickness of the spring wire changing over the length. This takes place, for example, by means of a gradually opening clamping device on a winding machine. In particular, the production of the spring 1 from the spring wire 2 on a winding bank is also expedient, wherein the spring wire is firmly clamped at one end on a winding rotor and is bent by a tool that does not rotate therewith and wound around the rotating winding rotor. If necessary, the spring wires 2 produced according to FIG. 1 to 3 have to have a projection in relation to the spring wire region used in the finished spring 1 in order to secure or guide the spring wires 2 during further processing in the winding machine or the automatic winder. These projections are cut off after winding or coiling and therefore do not have to be produced with a taper. They can, for example, protrude from the roller press 10" or the drum roller 10' during the production of the wire and thus retain the diameter of the blank 3.

Advantageously, the spring 1 can be used in the shown manner in valves or valve assemblies, since, with a compact design, they offer advantageous integration into existing installation spaces and, in addition, result in exact guidance and control of an actuator, such as a piston, over a very wide load range. The position of the actuator, such as in particular a piston, can thus be set exactly over the travel path since the travel path can be mapped precisely by the structure of the spring according to the shown method. A flow cross section can be reliably set, or a line can be reliably closed. This especially has consequences if, for example, a valve is to be designed to work over a wide range of fuel mass flows and fuel pressures.

The invention claimed is:

1. A method for producing a spring for use in a valve for setting a travel path of an actuator, the method comprising:
  providing a blank of wire to be formed into a spring wire, the blank having a constant diameter over a length thereof;
  providing a shaping device configured as a drum roller including:
    an inner rotor rotatable about a central longitudinal axis and having an outer lateral surface;

an outer drum surrounding the inner rotor and being concentric with the inner rotor, the outer drum having an inner lateral surface facing the outer lateral surface;
    an annular gap positioned between the outer lateral surface and the inner lateral surface, the annular gap having an input side and an output side and tapering continuously from the input side to the output side;
    wherein a width of the annular gap, viewed in a radial direction, is:
      at the input side, greater than a diameter of the blank; and
      at the output side, equal to or smaller than a desired minimum diameter of the spring wire;
  forming the spring wire to have a diameter varying over a length thereof by moving the blank through the annular gap from the input side to the output side;
  producing a nonlinear cylindrical spring by winding or coiling the spring wire.

2. The method according to claim 1, and further comprising operating the shaping device in a vertical alignment of the central longitudinal axis with the input side being an upper side and the output side being a lower side with respect to each other and moving the blank through the annular gap with assistance by gravity.

3. The method according to claim 1, and further comprising:
  providing a winding machine having a rotatable winding rotor with a clamping device that opens according to the diameter of the spring wire, and a stationary tool; and
  clamping one end of the spring wire to the rotatable winding rotor and winding the spring wire around the rotatable winding rotor against the stationary tool.

4. The method according to claim 1, and further comprising winding or coiling the spring wire cylindrically with respect to an inner diameter, a central diameter, or an outer diameter of the nonlinear cylindrical spring.

5. The use according to claim 1, and further comprising forming the spring wire to have the diameter varying over the length thereof in accordance with a spring load over the travel path to set a position of the actuator in the valve.

6. The method according to claim 1, and further comprising controlling a fuel mass flow or fuel pressure with the valve.

7. The method according to claim 1, wherein the annular gap tapers conically.

8. A method for producing a valve, comprising;
  producing a nonlinear cylindrical spring, the method of producing comprising:
    providing a blank of wire to be formed into a spring wire, the blank having a constant diameter over a length thereof;
    providing a shaping device configured as a drum roller including:
      an inner rotor rotatable about a central longitudinal axis and having an outer lateral surface;
      an outer drum surrounding the inner rotor and being concentric with the inner rotor, the outer drum having an inner lateral surface facing the outer lateral surface;
      an annular gap positioned between the outer lateral surface and the inner lateral surface, the annular gap having an input side and an output side and tapering continuously from the input side to the output side;

wherein a width of the annular gap, viewed in a radial direction, is:

at the input side, greater than a diameter of the blank; and at the output side, equal to or smaller than a desired minimum diameter of the spring wire;

forming the spring wire to have a diameter varying over a length thereof by moving the blank through the annular gap from the input side to the output side;

producing the nonlinear cylindrical spring by winding or coiling the spring wire; and installing the nonlinear cylindrical spring in the valve.

9. A method for producing a spring for use in a valve for setting a travel path of an actuator, the method comprising:

providing a blank of wire to be formed into a spring wire, the blank having a constant diameter over a length thereof;

providing a shaping device including:

a first shaping die having a first shaping surface;

a second shaping die having a second shaping surface, the first shaping die and the second shaping die arranged such that the first shaping surface and the second shaping surface face one another with a gap therebetween, the gap having an input side and an output side and the first shaping surface and the second shaping surface being configured to be non-parallel to one another such that the gap extends in a first direction extending from the input side to the output side and tapers continuously from the input side to the output side;

wherein a width of the gap is:

at the input side, greater than a diameter of the blank; and at the output side, equal to or smaller than a desired minimum diameter of the spring wire;

forming the spring wire to have a diameter varying over a length thereof by moving the blank through the gap from the input side to the output side while simultaneously moving at least one of the first shaping die and the second shaping die with respect to the other of the first shaping die and the second shaping die in a direction transverse to the first direction;

producing a nonlinear cylindrical spring by winding or coiling the spring wire.

\* \* \* \* \*